(No Model.)
C. YOUNG.
SPRING MOTOR FOR BICYCLES.
No. 567,630. Patented Sept. 15, 1896.
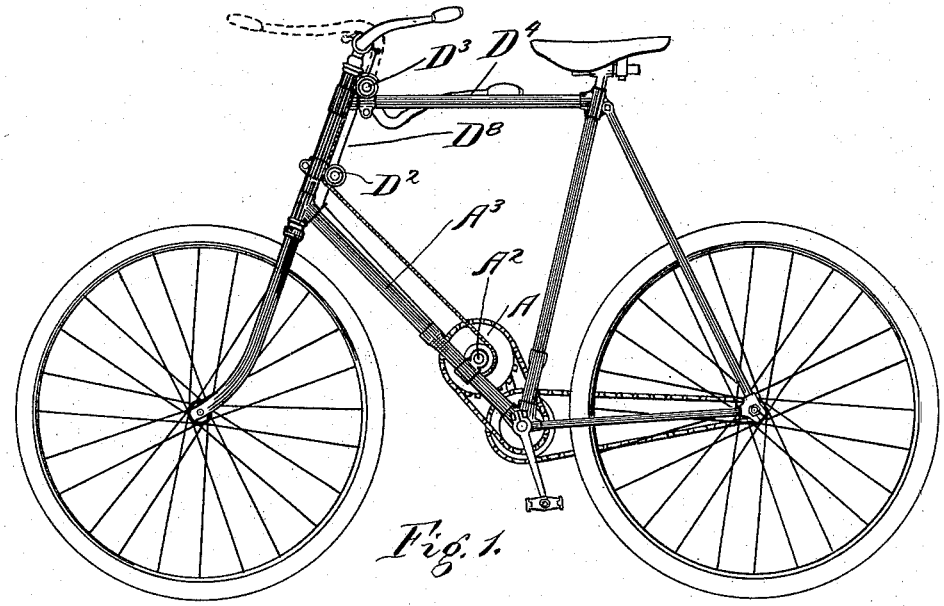
Fig. 1.
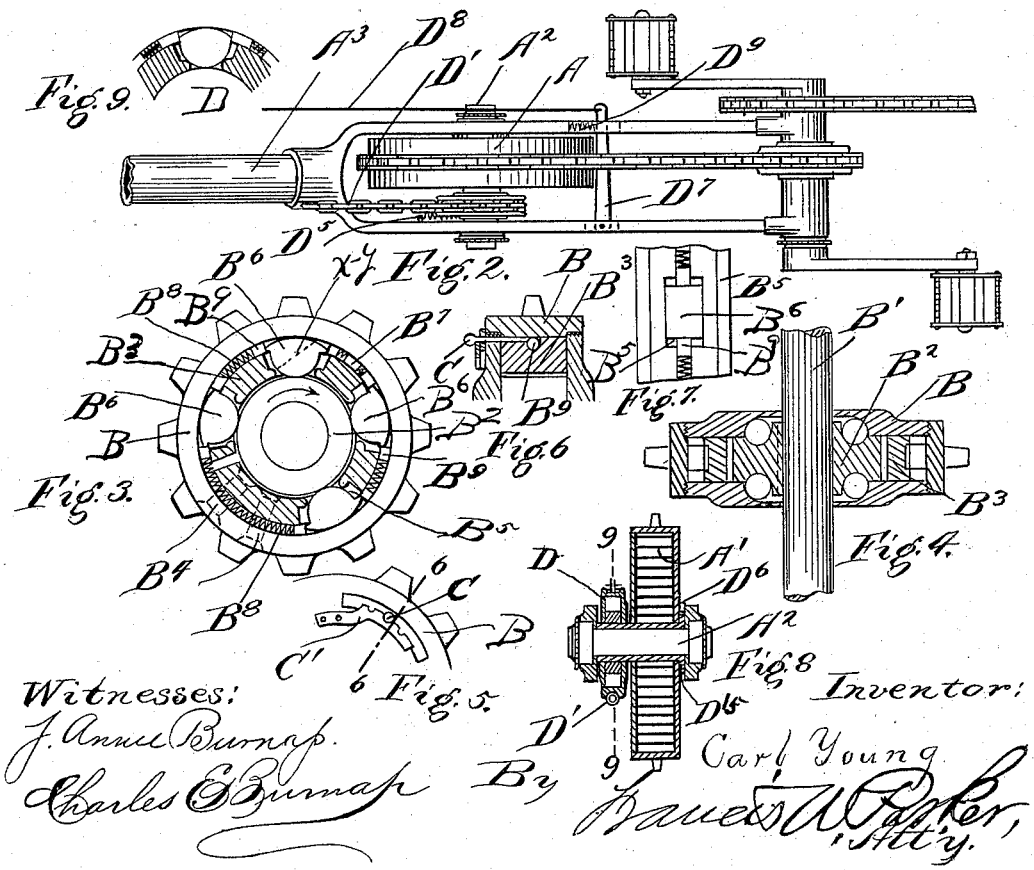
Witnesses:
J. Annie Burnap.
Charles E. Burnap.
Inventor:
Carl Young
By James W. Potter,
Att'y.

UNITED STATES PATENT OFFICE.

CARL YOUNG, OF CHICAGO, ILLINOIS.

SPRING-MOTOR FOR BICYCLES.

SPECIFICATION forming part of Letters Patent No. 567,630, dated September 15, 1896.

Application filed October 28, 1895. Serial No. 567,149. (No model.)

*To all whom it may concern:*

Be it known that I, CARL YOUNG, a citizen of the United States, residing at Chicago, in the county of Cook and State of Illinois, have invented certain Improvements in Spring-Motors for Bicycles, of which the following is a specification.

My invention relates to power-storing devices for bicycles, and has for its object to provide a new and improved device which may be connected to the bicycle, and by means of which power may be stored, the device being so constructed that it may be connected when desired with the bicycle so as to aid in propelling the same.

My invention is illustrated in the accompanying drawings, wherein—

Figure 1 is a side elevation of a bicycle embodying my invention. Fig. 2 is an enlarged plan view showing the power-storing device and manner of connecting it to the bicycle. Fig. 3 is a cross-section through the clutch by which the power-storing device is connected to the crank-shaft of the bicycle. Fig. 4 is a vertical section through the same. Fig. 5 is a side view of said clutch with parts omitted, showing the mechanism by which the clutch is controlled. Fig. 6 is a section on line 6 6, Fig. 5. Fig. 7 is an enlarged detail view of a portion of the clutch with the case removed. Fig. 8 is a section through the power-storing device. Fig. 9 is a section on line 9 9, Fig. 8, with parts omitted.

Like letters refer to like parts throughout the several figures.

As shown in the drawings, my power-storing device consists of a spring placed within the case A. This spring may be of any suitable construction, as, for example, a coil-spring $A'$. This case A is rotatably mounted upon a shaft $A^2$, connected with the frame $A^3$. The spring $A'$ has one end connected to said case and the other end connected to the shaft $A^2$. The periphery of the case A is provided with teeth and acts as a sprocket-wheel, and is connected by a chain with a sprocket-wheel on the crank-shaft of the bicycle. This sprocket-wheel consists of an outer case B, rotatably mounted upon the crank-shaft $B'$, and provided on its periphery with teeth which engage the sprocket-chain. A disk $B^2$ is keyed to the crank-shaft so as to rotate therewith, ball-bearings being interposed between said disk and the case B. A ring $B^3$ is located within the case B, and is rigidly connected therewith in any convenient manner, as by the rivets $B^4$. This ring $B^3$ is provided with a number of openings $B^5$, which extend therethrough. A series of eccentric rollers $B^6$ $B^6$ are located within these openings, so that their inner sides are adapted to engage the disk $B^2$ and their outer sides the case B. The ring $B^3$ is provided with a groove $B^7$, which extends completely around its periphery. A number of springs $B^8$ $B^8$ are placed within this groove, the ends of said springs bearing against the eccentric rollers $B^6$, as shown. These springs may bear directly against the rollers, or they may be attached at their ends to the plugs or pieces $B^9$, said pieces bearing against the eccentric rollers, as shown in Fig. 3. An arm C is connected with one of these springs in any manner, as by being connected with one of the pieces $B^9$, and projects through the side of the case B, as shown in Figs. 5 and 6.

A spring holding device $C'$, connected with the case B, is provided with notches and is so situated as to hold the arm C in certain predetermined positions, but allows it to be moved from those positions when desired. When this arm is in its central position, as shown in Fig. 5, the eccentric rollers are balanced by the springs $B^8$, so that their shortest diameter or distance is interposed between the disk $B^2$ and the case B. If now said arm is moved away from its central position, the spring $B^8$, to which it is connected, will be compressed and will therefore be forced against one of the rollers $B^6$. The pressure produced by this spring will tip said roller so that the parts at the end of the line X Y (for example, Fig. 3) will come in contact, respectively, with the disk $B^2$ and the case B. In other words, the eccentric roller will be tipped so that the distance between the points which make contact with the disk and with the case is greater than the distance between these points when the roller is in its normal position. This movement of one of the rollers will move the spring associated therewith and will be conveyed to the next so as to move it to the same relative position, and hence in in the same manner all of the rollers will be moved. If now the crank-shaft is rotated so that the disk B² is traveling in the direction of the arrow, Fig. 3, these eccentric rollers, being in contact with said disk, will be moved so as to increase the distance between the points on their peripheries that make contact with the case and the disk. This movement, it will be seen, will bind or connect the case and the disk together, so that they will rotate as one piece. It will also be seen that the binding tendency is increased by an increase of the power by which the shaft is driven. If the shaft is now rotated in the opposite direction, the engagegagement of the disk B² with the rollers will tend to decrease the distance between the points on the surface of such rollers which make contact, respectively, with the disk and the case, and hence there will be no tendency to connect the two together. This will also be so if the case B is rotated in the same direction and at a greater rate of speed than the crank-shaft. If the arm C is now moved to the opposite side, the eccentric rollers will be rocked in the opposite direction, and the case and shaft will only be connected together when said shaft is moved in a direction opposite to that indicated by the arrow, Fig. 3. It will be seen that I have here an automatic clutch which is operated by the movement of the parts to connect them together when said parts are moving in certain directions, and which is not affected so as to connect the parts together when said parts are moving in an opposite direction. It will also be seen that this clutch can be controlled so as to be made to be operated by the shaft when rotating in either direction. A similar clutch D is associated with the shaft A², to which the spring motor is connected. To the periphery of the case of this clutch is connected a flexible power-transmitting device D', which extends over a pulley D², fastened to the front fork of the machine, the end of said flexible power-transmitting device being rigidly connected with a pulley D³. An arm D⁴ is rigidly connected with said pulley. A coil-spring D⁵ is connected at one end with the periphery of the clutch D, the other end being connected to the frame or other rigid device, said spring acting in opposition to the flexible power-transmitting device D'. By this construction the clutch D is moved by the spring when the arm D⁴ is moved over to the position shown in dotted lines in Fig. 1, so as to coil the power-transmitting device thereupon, and hence when the arm D⁴ is moved back to the position shown in full lines the clutch will be moved by the uncoiling of the power-transmitting device. This clutch will be set so that it is connected with the shaft A² during this latter movement so as to move said shaft, and is disengaged from it during the former movement, that is, the movement produced by moving the handle into the position shown in dotted lines. A backward rotation of the shaft is prevented by the ratchet-wheel D⁵ and pawl D⁶. An arm D⁷ is pivoted to the frame A³, and is adapted to engage the teeth on the case A, so as to prevent the rotation of said case. A cord D⁸ is connected with one end of said arm and is carried along the frame of the bicycle, so as to be within easy reach of the rider. A spring D⁹ is associated with said arm D⁷, so as to act in opposition to the cord D⁸ and move said arm when the cord is released, so as to disengage it from the teeth on the case A. It will be seen by this construction that when the arm D⁷ is in engagement with the teeth on the case A the case is held stationary, and hence when the shaft A² is revolved the spring will be wound. If the cord D⁸ is now released, the spring D⁹ moves the arm D⁷ out of engagement with the teeth on the case A, and said case is rotated by the spring, such rotation being conveyed to the clutch on the crank-shaft. I may use an ordinary pawl-and-ratchet-wheel clutching device instead of the clutch D, when desired.

I have described these several parts in detail; but it is evident that they may be greatly varied in form, construction, and arrangement, and that some may be used alone or in connection with others (not herein shown) without departing from the spirit of my invention; and I therefore do not wish to be limited to the exact construction described.

The use and operation of my invention are as follows: In riding bicycles it often happens that the power needed to drive the machines varies greatly at different times and with the different conditions of the roads over which the bicycle is moving. It is therefore very desirable to have a power-storing device on the machine by which power can be stored up when the machine is running over roads which require but little effort of the rider, but can be utilized to aid the rider when the character of the road is such as to make it difficult to propel the machine. When a bicycle is provided with my power-storing device, these results can be obtained. The spring may be wound by hand, or such spring may be wound by being connected with the crank-shaft of the machine. When it is desired to wind the spring by hand, the arm D⁴ is moved to the position shown in dotted lines, Fig. 1. If now this arm is pulled back to its former position, the shaft A² will be moved, and if the case A is held stationary the spring will be partially wound. The spring may be completely wound up by continuing this motion. The clutch connected with the crank-shaft is normally in such a position that there is no engagement between it and said shaft, that is, the arm C is in the central position, as shown in Fig. 5. If after the spring is wound it is desired to connect it with the crank-shaft so as to aid in propelling said shaft, the arm C will be moved to one side of its central position and the eccentric rollers will be rocked, as has been before described, so as to be in a position to engage the disk B² when the case B is rotated at a speed greater than that of the crank-shaft, there being no engagement while the crank-shaft is moving at a speed greater than that of the case. If now the cord $D^8$ is released, the spring $D^9$ moves the arm $D^7$ so as to disengage it from the teeth on the case A. The spring motor is now released and by means of the sprocket-chain tends to rotate the case B. Said case is then connected with the crank-shaft by means of the eccentric rollers, and the force of the spring is exerted upon said shaft so as to rotate it. When the spring is unwound, the rotation of the case B will cease, and the continued movement of the crank-shaft by the rider will move the eccentric rollers $B^6$ so as to disengage the case and the shaft. The spring-motor may be again rewound by moving the arm $D^7$ into contact with the teeth on the case A. The spring-motor may be continuously used to aid the rider by working the arm $D^4$ while the spring is in connection with the crank-shaft. If it is desired to wind the spring by means of the crank-shaft, as, for example, when the pedaling is very light, the arm C is moved to the opposite side of its central position. The eccentric rollers $B^6$ are now moved so that the shaft and case B are connected together by the rotation of said shaft. If now the arm $D^7$ is moved out of engagement with the teeth on the case A, said case will be rotated and the spring wound. When the spring has been completely wound, the arm C will be moved back to the position where the clutch will be connected with the crank-shaft when the arm $D^7$ is disengaged from the teeth on the case A. It will be seen that I have here a power-storing device adapted to be operated either by the hand or by the feet of the rider, and which may be connected with the crank-shaft so as to aid in propelling the same. It will also be seen that I have here an automatic clutch which may be controlled so as to connect the crank-shaft with the motor or the motor with the crank-shaft, as desired.

I claim—

1. The combination with a bicycle of a spring the ends of which are fastened respectively to two parts movable with relation to each other, a hand-winding device by which the spring is wound associated with one of said parts, and a controllable winding connection between said other part and the crank-shaft of the bicycle whereby the spring may be wound either by hand or by the rotation of the crank-shaft.

2. The combination with a bicycle of a power-storing device comprising a spring connected at one end to a shaft, a rotatable case surrounding said spring and provided on its periphery with teeth, one end of said spring being connected with said case, a chain or the like engaging said teeth and adapted to connect said case with a clutch on the crank-shaft of the bicycle, said clutch so constructed that the spring may be operatively connected with the shaft so as to rotate it.

3. The combination with a bicycle of a spring connected at one end to a rotatable shaft, a rotatable case surrounding said spring and having the other end of said spring fastened thereto, a locking device for said spring, connecting mechanism between said spring and said shaft and adapted to connect them so that the spring may be wound by the rotation of said shaft, said connecting mechanism so constructed that the spring and shaft may be automatically connected together when the spring-locking device is removed.

4. A clutch comprising two parts movable with relation to each other, a series of eccentric rollers associated with said parts and adapted to connect them together a series of springs interposed between said rollers, each spring engaging the two adjacent rollers, and controlling mechanism connected with one of said springs by which their pressure against the adjacent rollers is varied.

5. A clutch comprising two parts movable with relation to each other, a series of eccentric rollers associated with said parts and adapted to connect them together, a series of free springs loosely interposed between said rollers, and a controlling-arm associated with said rollers and springs by which their position may be varied.

6. A clutch comprising two parts movable with relation to each other, a series of eccentric rollers associated with said parts and adapted to connect them together, a series of free springs loosely interposed between said rollers, and a controlling-arm associated with said rollers and springs by which their position may be varied, and a locking device for said arm substantially as described.

7. A clutch comprising a disk rigidly connected to a shaft, a case in which said disk is inclosed, a ring surrounding said disk and rigidly connected to said case, a series of openings extending through said ring, a series of eccentric rollers within said openings and adapted when in certain positions to operatively connect the disk and case together and a controlling device associated with said rollers and adapted when operated to vary their positions substantially as described.

8. The combination with a bicycle of a spring having its ends connected each to one of two rotatable parts, a clutch associated with the crank-shaft of the bicycle and comprising two parts movable with relation to each other a ring interposed between said parts and rigidly connected to one of them, said ring provided with a series of holes extending therethrough, a series of eccentric rollers situated in said openings and adapted when in certain predetermined positions to be actuated by the relative movement of the parts so as to lock them together, and a connecting device between one of the movable parts of the clutch and one of the movable parts to which the spring is connected.

9. The combination with a bicycle of a spring having its ends connected each to one of two movable parts, a clutch associated with the crank-shaft of the bicycle and comprising two parts movable with relation to each other, a series of eccentric rollers associated with said parts and adapted when in certain predetermined positions to be actuated by the relative movement of the parts so as to lock them together, and a connecting device between one of the movable parts of the clutch and one of the movable parts to which the spring is connected, and a controlling mechanism for said rollers by which their position is varied.

10. The combination with a bicycle of a spring having its ends connected respectively with two rotatable parts, a locking device for each of said parts, a clutch associated with the crank-shaft, comprising two parts movable with relation to each other, a series of eccentric rollers interposed between these two parts and adapted, when moved from their normal position, to be actuated by the relative movement of said parts so as to operatively connect the parts together, a series of springs associated with said eccentric rollers and adapted to hold them in a normal position, and an arm connected with said springs and adapted to move them so as to rock the said eccentric rollers and move them to a position where the relative movement of the two parts of the clutch will cause them to engage said parts so as to operatively connect them together.

11. A clutch device comprising two parts adapted to be moved with relation to each other a ring interposed between said parts and provided with openings extending therethrough, a series of eccentric rollers situated in said openings and interposed between said parts and adapted when rocked or moved in one direction from their normal position to be actuated by the relative movement of said parts in one direction so as to operatively connect them together, but leave them free to move relatively in the opposite direction, and a controlling device connected with said eccentric rollers by which they may be moved in either direction from their normal position.

12. A clutch device comprising two parts adapted to be moved with relation to each other, a series of eccentric rollers interposed between said parts and adapted when rocked or moved in one direction from their normal position to be actuated by the relative movement of said parts in one direction so as to operatively connect them together, but leave them free to move relatively in the opposite direction, a series of free springs loosely interposed between said eccentric rollers and adapted to normally hold them so that the two parts of the clutch will be free to move with relation to each other, and an arm or lever connected with said eccentric rollers, and springs so as to move or rock said eccentric rollers in either direction whereby the parts of the clutch will be connected together.

13. The combination with a bicycle of a spring, two movable parts to which the ends of said spring are attached, one end to each part, a locking device for each of said parts, a clutch associated with the crank-shaft of the bicycle and comprising two parts adapted to be moved with relation to each other, a series of eccentric rollers interposed between said parts and adapted when rocked or moved in one direction from their normal position to be actuated by the relative movement of said parts in one direction so as to operatively connect them together, but leave them free to move relatively in the opposite direction, and a controlling device connected with said eccentric rollers by which they may be moved in either direction from their normal position, a power-transmitting device operatively connecting one part of said clutch with one of the parts to which said spring is fastened whereby the spring may be operatively connected with the crank-shaft, substantially as described.

14. The combination with a bicycle of a spring, the ends of which are fastened respectively to two parts movable with relation to each other, a hand-winding device by which the spring is wound associated with one of said parts, a controllable winding connection between said other part and the crank-shaft of the bicycle, said connection comprising two parts movable with relation to each other, a series of eccentric rollers associated with said parts and adapted to connect them together, a series of springs loosely interposed between said rollers, said springs engaging the two adjacent rollers, and a controlling mechanism connected with one of said springs by which their pressure against the adjacent rollers may be varied.

15. A clutch comprising a disk rigidly connected to a shaft, a case in which said disk is inclosed, a ring surrounding said disk and rigidly connected to said case, there being a series of openings extending through said ring, a series of eccentric rollers within said openings and adapted when in certain positions to operatively connect the disk and case together, a series of springs loosely interposed between said rollers, the ends of each spring being normally in contact with the two adjacent rollers and a controlling device connected with one of said springs and adapted when operated to vary the pressure of said springs against the adjacent rollers so as to change their position.

CARL YOUNG.

Witnesses:
 FRANCIS W. PARKER,
 BERTHA C. SIMS.